No. 692,266. Patented Feb. 4, 1902.
C. GLOVER.
KNOB ATTACHMENT.
(Application filed Sept. 12, 1900. Renewed Jan. 2, 1902.)
(No Model.)
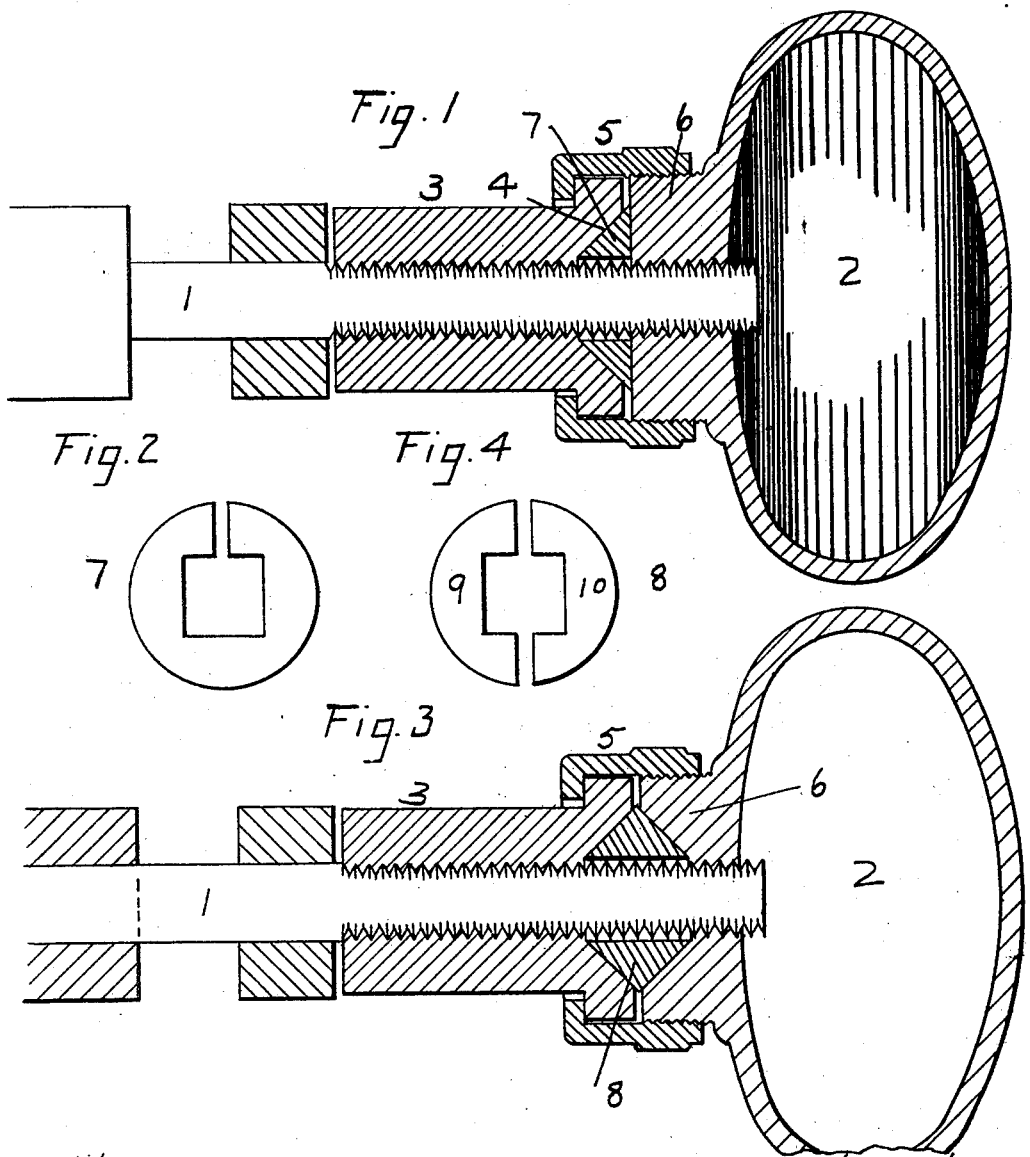
Witnesses:
Arthur N. Upson.
Conway.
Inventor.
Charles Glover.
by H. E. Hart
his attorney

UNITED STATES PATENT OFFICE.

CHARLES GLOVER, OF NEW BRITAIN, CONNECTICUT.

KNOB ATTACHMENT.

SPECIFICATION forming part of Letters Patent No. 692,266, dated February 4, 1902.

Application filed September 12, 1900. Renewed January 2, 1902. Serial No. 88,031. (No model.)

*To all whom it may concern:*

Be it known that I, CHARLES GLOVER, a citizen of the United States, and a resident of New Britain, in the county of Hartford and State of Connecticut, have invented certain new and useful Improvements in Knob Attachments, of which the following is a full, clear, and exact description, whereby any one skilled in the art can make and use the same.

The object of this invention is to improve and simplify the construction of knob attachments of the kind which do away with the use of screws for holding the knob on the spindle, and the means by which these objects are accomplished are shown in the accompanying drawings, in which—

Figure 1 is a sectional view of my invention as applied to door-knobs. Fig. 2 is a view of the split washer shown in Fig. 1. Fig. 3 is a modified form of my invention. Fig. 4 is a view of the gripping device shown in Fig. 3.

Referring to the drawings, 1 denotes an ordinary knob-spindle; 3, a knob-shank threaded on said spindle; 4, a recess formed in one end of said shank; 2, a knob, also threaded on the spindle; 5, a collar engaging lugs on the shank and threaded to fit threads formed on the hub 6 of the knob, said threads being opposite in direction to those on the spindle.

7 denotes a split ring located in the recess 4 in the shank and having a sliding fit on the spindle.

In the practice of my invention the shank is screwed onto the spindle as far as desired, the split ring is placed in the recess 4, the knob is screwed up against the ring, forcing it into the recess, and thus contracting it about the spindle, and the collar is then screwed onto the knob-hub, locking the parts in position. Thus the knob and shank are positively held against movement along the spindle by the threads, the ring takes up any looseness between the knob and the shank and being split is securely clamped around the spindle, preventing any wear of the spindle in the hole, and the collar 5 locks the parts together and keeps the knob from unscrewing when in use.

Of course it is immaterial how many of the gripping devices are used, what their shape is, and where they are located, as long as they operate to bring about the results desired, and in Figs. 3 and 4 I have shown one modification of the invention in which a double conical washer 8 is used, both the shank and the knob being recessed to accommodate it, and the washer is made in sections 9 10. It is clear that many other alterations may be made in the number and arrangement of parts without departing from the spirit of my invention, and I desire to include herein any and all such modifications.

I claim as my invention—

1. In a knob attachment, the threaded spindle, the knob and its separable shank threaded to fit threads on the spindle, a split ring located between the knob and shank and adapted to be compressed thereby, said ring having a sliding fit on the spindle, and a collar uniting the knob and shank.

2. In a knob attachment a threaded spindle, the knob and its separable shank threaded to fit the threads on the spindle, a contractible ring located between the knob and shank and adapted to be contracted thereby, and a collar uniting the knob and its shank by means of a thread opposite in direction to that on the spindle.

Signed at New Britain, Connecticut, this 6th day of August, 1900.

CHARLES GLOVER.

Witnesses:
 GEO. E. CHRIST,
 H. HERBERT WETHERILL.